United States Patent
Ladouce et al.

(12)

(10) Patent No.: US 6,512,038 B1
(45) Date of Patent: Jan. 28, 2003

(54) USE OF ALUMINUM HYDROXYCARBONATE, HYDROXYOXYCARBONATE OR OXYCARBONATE AS FILLER IN A RUBBER COMPOSITION

(75) Inventors: Laurence Ladouce, Lille (FR); Thierry Chopin, Saint-Leu-la Foret (FR); Pierre-Yves Le Goff, Paris (FR); Michel Martin, Lyon (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/807,315
(22) PCT Filed: Oct. 13, 1999
(86) PCT No.: PCT/FR99/02483
 § 371 (c)(1),
 (2), (4) Date: May 21, 2001
(87) PCT Pub. No.: WO00/22034
 PCT Pub. Date: Apr. 20, 2000

(30) Foreign Application Priority Data

Oct. 13, 1998 (FR) .......................................... 98 13175

(51) Int. Cl.$^7$ .................................................. C08K 3/10
(52) U.S. Cl. ....................................... 524/437; 524/424
(58) Field of Search ................................. 524/424, 437

(56) References Cited

U.S. PATENT DOCUMENTS 4,492,682 A    1/1985    Trebillon .................... 423/626

FOREIGN PATENT DOCUMENTS

| EP | 0 097 330 | 1/1984 | .............. C08J/3/24 |
| EP | 0 807 603 | 11/1997 | ............. C01F/7/02 |
| EP | 0 810 258 | 12/1997 | ............ C08K/3/22 |

OTHER PUBLICATIONS

International Search Report.

*Primary Examiner*—Kriellion A. Sanders

(57) ABSTRACT

The invention concerns the use as filler in a rubber composition based on an elastomer, of a compound consisting of an amorphous aluminum hydroxycarbonate, hydroxyoxycarbonate or oxycarbonate. The invention also concerns rubber compositions comprising such a filler and finished products based on such a composition.

26 Claims, No Drawings

USE OF ALUMINUM HYDROXYCARBONATE, HYDROXYOXYCARBONATE OR OXYCARBONATE AS FILLER IN A RUBBER COMPOSITION

This application is an application under 35 U.S.C. Section 371 of International Application Number PCT/FR99/02483 filed on Oct. 13, 1999.

The present invention relates to the use as filler, in rubber compositions, of amorphous aluminum hydroxycarbonate, hydroxyoxycarbonate or oxycarbonate.

It also relates to the rubber compositions thus obtained.

Finally, it also relates to finished articles based on these compositions and in particular to tire covers.

It is known to employ reinforcing white fillers in elastomers, such as, for example, precipitated silica or alumina. However, the results are not always those hoped for.

The aim of the invention is to provide a filler for rubber compositions which provides them with a satisfactory compromise with regard to properties, namely, preferably:

very good rheological properties and excellent suitability for vulcanization, comparable with those of highly dispersible precipitated silicas but much better than those provided by alumina, particularly outstanding dynamic properties, in particular a Payne effect of low amplitude, resulting in a low resistance to rolling for tires based on these compositions, and/or a very high tangent δ at 0° C., resulting in an improved adhesion for tires based on these compositions, good strengthening in terms of modulus, a rather high resistance to thermal aging and to UV (ultraviolet radiation) aging.

With this aim, a subject matter of the present invention is the use as filler, in a rubber composition, of at least one compound (A) composed of an amorphous aluminum hydroxycarbonate or an amorphous aluminum hydroxyoxycarbonate or an amorphous aluminum oxycarbonate.

More particularly, said hydroxycarbonate, hydroxyoxycarbonate or oxycarbonate comprises at least 0.01, in particular at least 0.04, mol of carbonate per mole of aluminum; it can comprise at least 0.1 mol of carbonate per mole of aluminum. In general, its carbonate/aluminum molar ratio is at most 0.25, in particular at most 0.2.

The carbonates present in the hydroxycarbonate, hydroxyoxycarbonate or oxycarbonate and which can be detected by infrared spectroscopy are usually covalent.

The compound (A) generally has a BET specific surface area of between 40 and 150 m$^2$/g, in particular between 45 and 95 m$^2$/g; it can be between 50 and 75 m$^2$/g. The BET surface area is determined according to the Brunauer-Emmet-Teller method described in "The Journal of the American Chemical Society", Vol. 60, page 309, February 1938, which corresponds to NF Standard T 45007 (November 1987).

This compound (A) preferably exhibits a low proportion of reactive surface Al—OH functional groups.

Some preferred but nonlimiting alternative forms of the invention are described below.

According to a first alternative form of the invention, the compound (A) employed is an amorphous aluminum hydroxycarbonate corresponding to the following empirical formula (I)

$$Al(OH)_x(CO_3)_y \cdot zH_2O \qquad (I)$$

in which $0.5 \leq x \leq 3$, for example $1 \leq x \leq 3$ $0.01 \leq y \leq 0.25$, for example $0.04 \leq y \leq 0.25$, in particular $0.1 \leq y \leq 0.25$ $z \leq 1.5$, for example $z \leq 1$ In this formula (I), y can be at most equal to 0.2.

In the context in particular of this alternative form of the invention, the compound (A) preferably has the following property: it remains amorphous (its X-ray diffraction spectrum remains flat) after having been calcined (under air) for 2 hours at any temperature between 150 and 700° C. or after having been subjected to a treatment which consists of a rapid dehydration using a gas stream at 600° C., the contact time of the compound with this gas being from 1 to 2 seconds.

In this alternative form of the invention, the compound (A) is generally formed of aggregates of individual particles which are not or not very porous, for example substantially spherical, with a size which can be between 15 and 25 nm.

According to a second alternative form of the invention, the compound (A) employed results from the calcination (in particular under air) at any temperature between 150 and 700° C., in particular between 180 and 650° C., of an amorphous aluminum hydroxycarbonate (known as starting amorphous aluminum hydroxycarbonate), in particular for 1 to 3 hours, for example for 2 hours.

In this alternative form, the starting amorphous aluminum hydroxycarbonate preferably has the following property: it remains amorphous after having been subjected to a treatment which consists of a rapid dehydration using a gas stream at 600° C., the contact time of the compound with this gas being from 1 to 2 seconds.

According to a third alternative form of the invention, the compound (A) employed results from the rapid dehydration of an amorphous aluminum hydroxycarbonate (known as starting amorphous aluminum hydroxycarbonate) using a gas stream at a temperature of between 500 and 700° C., in particular equal to 600° C., the contact time of this starting amorphous aluminum hydroxycarbonate with this gas being between a fraction of a second and 4 seconds, in particular between 1 and 2 seconds.

In this alternative form, the starting amorphous aluminum hydroxycarbonate preferably has the following property: it remains amorphous after having been calcined (under air) for 2 hours at any temperature between 150 and 700° C.

In the second and third alternative forms in particular of the invention, the compound (A) employed advantageously exhibits a high dispersibility. This dispersibility is quantified using the measurement of the level of fines ($\tau_f$), that is to say of the proportion (by weight) of particles with a size of less than 0.3 μm, after deagglomeration with ultrasound, carried out according to the test described below.

In this test, the ability of the compound to disperse is measured by a particle size measurement (by sedimentation) carried out on suspension of the compound, which suspension has been deagglomerated beforehand by treatment with ultrasound. The deagglomeration (or dispersion) under ultrasound is carried out using a Branson OSI sonifier (450 W) equipped with a probe with a diameter of 12 mm. The particle size measurement is carried out using a SediGraph particle sizer (sedimentation in the field of gravity+scanning with a beam of X-rays).

4 grams of compound (A) are weighed out in a sample tube (with a volume equal to 75 ml) and the weight is made up to 50 grams by addition of a 1 g/l sodium hexametaphosphate solution: an aqueous suspension comprising 8% of compound (A) is thus prepared, which suspension is homogenized for 2 minutes with magnetic stirring. Deagglomeration (dispersion) under ultrasound is then carried out as follows: after the probe has been immersed over a length of 4 cm, the output power is adjusted so as to obtain a deviation of the power needle indicating 20%. Deagglomeration is carried out for 180 seconds.

The particle size measurement is subsequently carried out by means of a SediGraph particle sizer. For this, the vertical rate of scanning of the cell by the beam of X-rays is first adjusted to 946, which corresponds to an analyzed maximum size of 63 µm. Deionized water is circulated in said cell and then the electrical zero and the mechanical zero of the paper recorder are adjusted (this adjustment being carried out with the "100%" potentiometer of the recorder at the maximum sensitivity). The pen of the paper recorder is placed at the point representing the starting size of 85 µm. The suspension of deagglomerated compound (A), optionally cooled beforehand, is subsequently circulated in the cell of the SediGraph particle sizer (the particle size analysis being carried out at 30° C.) and the analysis then begins. The analysis is automatically halted as soon as the size of 0.3 µm is reached (approximately 45 minutes). The level of fines ($\tau_f$), that is to say the proportion (by weight) of particles with a size of less than 0.3 µm, is then calculated.

This level of fines ($\tau_f$) or level of particles with a size of less than 0.3 µm increases in proportion as the compound increases in dispersibility.

In the second and third alternative forms in particular of the invention, the compound (A) employed exhibits a level of fines ($\tau_f$) of at least 80%, in particular of at least 90%, indeed even of at least 95%.

In the second and third alternative forms of the invention, the starting amorphous aluminum hydroxycarbonate preferably comprises at least 0.01, in particular at least 0.04, mol of carbonate per mole of aluminum; it can comprise at least 0.1 mol of carbonate per mole of aluminum. In general, its carbonate/aluminum molar ratio is at most 0.25, in particular at most 0.2.

The carbonates present in this starting amorphous aluminum hydroxycarbonate and which can be detected by infrared spectroscopy are usually covalent.

This starting amorphous aluminum hydroxycarbonate generally has a BET specific surface area of between 40 and 150 m²/g, in particular between 45 and 95 m²/g; it can be between 50 and 75 m²/g.

It is generally formed of aggregates of individual particles which are not or not very porous, for example substantially spherical, with a size which can be between 15 and 25 nm.

It preferably has a low proportion of reactive surface Al—OH functional groups.

Likewise, the starting amorphous aluminum hydroxycarbonate preferably corresponds to the following emperical formula (I)

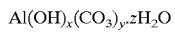  (I)

in which $0.5 \leq x \leq 3$, for example $1 \leq x \leq 3$ $0.01 \leq y \leq 0.25$, for example $0.04 \leq y \leq 0.25$, in particular $0.1 \leq y \leq 0.25$ $z \leq 1.5$, for example $z \leq 1$ In this formula (I), y can be at most equal to 0.2.

In the second and third alternative forms of the invention, the starting amorphous aluminum hydroxycarbonate, in particular when it corresponds to the empirical formula (I) mentioned above, can be prepared by the following process.

A precipitation reaction is carried out by introduction of a gas mixture, including carbon dioxide ($CO_2$) gas, into a suspension of alkali metal aluminate, in particular of sodium aluminate, contained in a reaction chamber.

This sodium aluminate suspension can in particular exhibit a concentration, expressed in $Al_2O_3$, of between 10 and 150 g/l, in particular between 20 and 100 g/l; this concentration is, for example, between 40 and 70 g/l.

It generally has an $Na_2O/Al_2O_3$ molar ratio of between 1 and 2, preferably between 1.15 and 1.75.

Its pH can vary, for example, between 11 and 13.5, in particular between 12 and 13.

The starting reaction temperature, that is to say the temperature of the aluminate suspension at the beginning of the introduction of the gas mixture, is usually set at at most 15° C.; it is, for example, between 5 and 15° C.

The reaction is generally carried out with stirring.

The gas mixture which is introduced into the reaction chamber preferably includes, in addition to the carbon dioxide gas, air. This gas mixture can then comprise 20 to 50%, in particular 30 to 40%, by volume of carbon dioxide gas and 50 to 80%, in particular 60 to 70%, by volume of air.

The pressure in the reaction chamber is maintained, throughout the reaction, preferably between 1.3 and 3.5 bar, for example between 1.7 and 2.5 bar.

The final reaction temperature should generally be at most 25° C.; it is, for example, between 10 and 25° C. It is preferable to maintain cooling in the reaction chamber during the carbonation.

The duration of the reaction (carbonation) can be between 10 and 60 minutes, for example between 10 and 30 minutes.

The pH of the reaction medium at the end of the reaction is generally between 9.5 and 10.5.

The control of the pH and of the temperature makes it possible to prevent the formation of an undesired phase, dawsonite.

The precipitate obtained is then usually filtered off and optionally washed, for example with water. Here, if any type of filtration means can be employed, use is advantageously made of a filter press.

The product obtained is then, optionally after resuspending (or reslurrying), dried, preferably by spraying, in particular using a sprayer of APV type, within a temperature for example of between 400 and 500° C. and at a temperature for example of between 100 and 135° C.

The amorphous aluminum hydroxycarbonate obtained can be subjected to a final milling operation by means of any suitable known device in order to "break up" the agglomerates/aggregates.

The rubber compositions in which the amorphous aluminum hydroxycarbonate or oxycarbonate is used as filler (in particular as reinforcing filler) are generally based on one or more elastomers.

Mention may more particularly be made, among suitable elastomers, of elastomers exhibiting a glass transition temperature of between −150 and +20° C.

Mention may in particular be made, as possible elastomers, of diene elastomers.

For example, mention may be made of natural rubber, polymers or copolymers deriving from aliphatic or aromatic monomers comprising at least one unsaturation (such as, in particular, ethylene, propylene, butadiene, isoprene or styrene), poly(butyl acrylate), or their combinations; mention may also be made of silicone elastomers and halogenated elastomers.

The filler present in said rubber compositions is formed at least partially, in particular predominantly, by weight by the compound (A) composed of an amorphous aluminum hydroxycarbonate or hydroxyoxycarbonate or oxycarbonate. Another compound, such as precipitated silica, in particular a highly dispersible compound, can optionally be employed as filler but generally in a minor proportion by weight with respect to the compound (A).

These compositions preferably do not comprise precipitated silica as filler and/or the filler is formed entirely of the compound (A).

The rubber compositions generally comprise, in addition, at least one coupling agent and/or at least one coating agent.

The invention also relates to finished articles based on the rubber compositions described above. Mention may be made, as finished articles, of tire covers in particular the walls and the tread of tire, shoe soles, and the like.

The following examples illustrate the invention without, however, limiting the scope thereof.

EXAMPLE 1

Use is made of a reactor with a volume of 100 liters, provided with a jacket and equipped with a stirring means appropriate for gas/liquid transfer, namely a Rushton turbine, which can operate under pressure (the required dissipated power is approximately 4 kW/m$^3$).

17.8 liters of a sodium aluminate solution having a concentration, expressed as $Al_2O_3$, of 290 g/l and an $Na_2O/Al_2O_3$ molar ratio of 1.45 are introduced into this reactor. The reaction volume is subsequently made up to 100 liters with deionized water. The pH of the suspension obtained is greater than 12.

This suspension is cooled via the jacket; its temperature is thus brought to 10° C.

A gas mixture exhibiting the following composition:

Q ($CO_2$) 10 Sm$^3$/h

Q (air) 18.6 Sm$^3$/h is subsequently introduced into the reactor under the Rushton turbine.

The pressure in the reactor is maintained at 2 bar.

The reaction (carbonation) lasts approximately 15 minutes.

Cooling is maintained in the jacket throughout the duration of the reaction. The final temperature of the reaction mixture is approximately 20° C.

The end of the reaction can be monitored in particular using a pH probe. The final pH of the reaction mixture is 10.

The precipitate formed is subsequently filtered off by means of a filter press and washed using deionized water, the amount of water employed in the washing being of the order of 67 l/kg of dry solid (expressed as $Al_2O_3$).

Finally, the product obtained, after reslurrying in deionized water, is dried by spraying using an APV sprayer with an inlet temperature of 450° C. and outlet temperature of 125° C.

The product thus prepared is an amorphous aluminum hydroxycarbonate: its X-ray diffraction spectrum is flat.

This product remains amorphous after having been calcined for 2 hours under air at 200° C., 400° C. and 600° C.; it also remains amorphous after having been subjected to rapid dehydration using a gas stream at 600° C., the contact time of the product with this gas being from 1 to 2 seconds.

The carbonates present in this product, detected by infrared spectroscopy, are covalent in nature. This product comprises 0.1 mol of carbonate per mole of aluminum.

It has a level of fines ($\tau_f$), after deagglomeration with ultrasound, of 25% by weight.

Its, BET specific surface area is 90 m$^2$/g.

EXAMPLE 2

The aluminum hydroxycarbonate prepared in example 1 is calcined under air for 2 hours at a temperature of 200° C.

The compound then obtained, referenced AHC1, is amorphous.

The carbonates present in this compound, detected by infrared spectroscopy, are covalent in nature. The compound AHC1 comprises 0.09 mol of carbonate per mole of aluminum.

Its particle size (Malvern) is 5.0 μm.

It has a level of fines ($\tau_f$), after deagglomeration with ultrasound, of 94% by weight.

Its BET specific surface area is 75 m$^2$/g.

EXAMPLE 3

The hydroxyoxycarbonate, referenced AHC1, prepared in example 2 is subjected to a milling operation using an air jet mill in order to "break up" the agglomerates/aggregates.

The amorphous compound obtained is referenced AHC2.

The carbonates present in this compound, detected by infrared spectroscopy, are covalent in nature. The compound AHC2 comprises 0.09 mol of carbonate per mole of aluminum.

Its particle size (Malvern) is 1.25 μm.

It has a level of fines ($\tau_f$), after deagglomeration with ultrasound, of 94% by weight.

Its BET specific surface area is 75 m$^2$/g.

EXAMPLE 4

The aluminum hydroxycarbonate prepared in example 1 is calcined under air for 2 hours at a temperature of 600° C.

It is subsequently subjected to a milling operation using an air jet mill in order to "break up" the agglomerates/aggregates.

The amorphous compound obtained is referenced AHC3.

The carbonates present in this compound, detected by infrared spectroscopy, are covalent in nature. The compound AHC3 comprises 0.05 mol of carbonate per mole of aluminum.

Its: particle size (Malvern) is 0.95 μm.

It has a level of fines ($\tau_f$), after deagglomeration with ultrasound, of 95% by weight.

Its BET specific surface area is 58 m$^2$/g.

EXAMPLE 5

The following industrial rubber formulations are prepared (Table 1: compositions in parts by weight).

TABLE 1

|  | Composition R | Composition 1 |
|---|---|---|
| SBR[1] | 100 | 100 |
| SiO$_2$ filler[2] | 50 | 0 |
| AHC1 filler | 0 | 70 |
| Si69 silane[3] | 4 | 4 |
| Diphenylguanidine | 1.45 | 1.45 |
| Stearic acid | 2.5 | 2.5 |

TABLE 1-continued

|  | Composition R | Composition 1 |
|---|---|---|
| Zinc oxide | 2.5 | 2.5 |
| Antioxidant[4] | 1.45 | 1.45 |
| Sulfenamide[5] | 2 | 2 |
| Sulfur | 1 | 1 |

[1]Styrene-butadiene copolymer synthesized in solution (Buna VSL 5525-0 type), comprising 27.3% of oil
[2]Filler formed by a precipitated silica of example 12 of EP-A-0 520 862
[3]Filler/rubber coupling agent (sold by Degussa)
[4]N-(1,3-Dimethylbutyl)-N'-phenyl-p-phenylenediamine
[5]N-Cyclohexl-2-benzothiazylesulfenamide The compositions are prepared by thermally/mechanically working the elastomers in an internal mixer (Banbury type) with a volume of 1 liter, in two stages, with a mean speed of the blades of 80 revolutions/minute, until a temperature of 160° C. is obtained, these stages being followed by a finishing stage carried out on an external mixer.

The vulcanization of the formulations is suited to the kinetics of vulcanization of the corresponding blends.

The properties of the compositions are set out below, the measurements having been carried out (on the vulcanized formulations), as in the case of the compositions of example 6 below, according to the following standards and/or methods:

Rheological and vulcanization properties
Mooney consistency: NF Standard T 43005 (measurement of Mooney broad (1+4) at 100° C. using a Mooney viscometer).
Vulcanization: NF Standard T 43015.

A Monsanto 100 S rheometer is used, in particular for the measurement of the mini. torque (Cmin) and of the maxi. torque (Cmax).

Ts2 corresponds to the time during which control of the mixing is possible; the rubber blend cures from Ts2 (beginning of the vulcanization).

T90 corresponds to the time at the end of which 90% of the vulcanization has been carried out.

Mechanical properties
Tension (moduli): NF Standard T 46002

The moduli x% correspond to the stress measured at x% of deformation under tension.
Shore A hardness: ASTM Standard D2240

The value considered is determined 15 seconds after application of the force.
Dynamic properties
Payne effect:

The true (G') and imaginary (G") moduli and the tangent of the loss angle (tan δ), defined as the ratio of G" to G', are measured at different degrees of deformation on a mechanical spectrometry device (Viscoanalyzer VA2000 from Metravib RDS).

The conditions of the test are as follows:
The test specimens are parallelepipedal in shape (length 6 mm, width 4 mm, thickness 2.5 mm, approximately). A sinusoidal deformation of increasing amplitude is applied at a constant frequency of 5 Hz. G', G" and tan δ are evaluated at each degree of deformation. Hereinbelow, ΔG' refers to the difference between the modulus G' measured at a deformation under shear conditions of 0.001 and the modulus G' measured at a deformation under shear conditions of 1, and tan δ max corresponds to the maximum of the tangent of the loss angle as a function of the deformation.

Temperature dynamic (scanning):
The real (E') and imaginary (E") moduli and the tangent of the loss angle (tan δ), defined as the ratio of E" to E', are measured at different temperatures on a mechanical spectrometry device (Viscoanalyzer VA2000 from Metravib RDS).

The conditions of the test are as follows:
The test specimens are parallelepipedal in shape (length 10 mm, width 6 mm, thickness 2.5 mm, approximately). A sinusoidal deformation with a constant amplitude of 10 microns is applied at a constant frequency of 10 Hz. E', E" and tan δ are evaluated as a function of the temperature. The temperature scanning rate is 0.5° C./min. Hereinbelow, tan δ max (T) corresponds to the maximum of the tangent of the loss. angle as a function of the temperature.

Resistance to temperature aging and to UV radiation:
The resistance to thermal aging is evaluated under tension on samples which have spent a week in an oven at a temperature of 60° C.

The resistance to UV-A aging is evaluated under tension on samples which have spent 100 hours in a Con Atlas UW device at a temperature of 60° C.

In both these cases, the results are expressed as tensile strength and deformation at break and are standardized with respect to the value of the tensile strength and deformation before aging.

TABLE 2

|  | Composition R | Composition 1 |
|---|---|---|
| Mooney consistency | 56 | 67 |
| Vulcanization |  |  |
| Cmin (In. lb) | 11.4 | 13 |
| Ts2 (min) | 9 | 7 |
| T90 (min) | 34 | 25 |
| Cmax (In. lb) | 64 | 68 |
| Mechanical |  |  |
| Modulus 100% (MPa) | 2.2 | 3.5 |
| Modulus 300% (MPa) | 12.9 | 13.3 |
| Dynamic (Payne effect) |  |  |
| ΔG' (MPa) | 1.15 | 0.52 |
| tan δ max | 0.36 | 0.28 |

TABLE 3

| Aging | Composition R | Composition 1 |
|---|---|---|
| Deformation at break |  |  |
| Initial | 100 | 100 |
| Thermal | 95 | 125 |
| UV | 69 | 103 |
| Tensile strength |  |  |
| Initial | 100 | 100 |
| Thermal | 104 | 104 |
| UV | 68 | 84 |

It is found that composition 1 according to the invention exhibits an advantageous compromise in properties with respect to the reference composition (composition R).

With a Mooney viscosity and kinetics of vulcanization comparable to those of the reference composition, composition 1 results in a more pronounced strengthening in terms of modulus. A sharp drop in the amplitude of the fall in the modulus (Payne effect) is observed with composition 1, being revealed also by a drop in the maximum of tangent δ as a function of the deformation.

Composition 1 additionally offers a better resistance to thermal aging and to UV aging than that of the reference composition.

EXAMPLE 6

The following industrial rubber formulations are prepared (Table 4: compositions in parts by weight).

TABLE 4

|  | Composition R | Composition 2 | Composition 3 |
|---|---|---|---|
| SBR[(1)] | 100 | 100 | 100 |
| $SiO_2$ filler[(2)] | 50 | 0 | 0 |
| AHC2 filler | 0 | 70 | 0 |
| AHC3 filler | 0 | 0 | 70 |
| Si69 silane[(3)] | 4 | 4 | 4 |
| Diphenylguanidine | 1.45 | 1.45 | 1.45 |
| Stearic acid | 2.5 | 2.5 | 2.5 |
| Zinc oxide | 2.5 | 2.5 | 2.5 |
| Antioxidant[(4)] | 1.45 | 1.45 | 1.45 |
| Sulfenamide[(5)] | 2 | 2 | 2 |
| Sulfur | 1 | 1 | 1 |

[(1)]Styrene-butadiene copolymer synthesized in solution (Buna VSL 5525-0 type), comprising 27.3% of oil
[(2)]Filler formed by a precipitated silica of example 12 of EP-A-0 520 862
[(3)]Filler/rubber coupling agent (sold by Degussa)
[(4)]N-(1,3-Dimethylbutyl)-N'-phenyl-p-phenylenediamine
[(5)]N-Cyclohexl-2-benzothiazylesulfenamide The compositions are prepared by thermally/mechanically working the elastomers in an internal mixer (Banbury type) with a volume of 1 liter, in two stages, with a mean speed of the blades of 80 revolutions/minute, until a temperature of 160° C. is obtained, these stages being followed by a finishing stage carried out on an external mixer.

The vulcanization of the formulations is suited to the kinetics of vulcanization of the corresponding blends.

The properties of the compositions are set out below, the measurements having been carried out (on the vulcanized formulations) according to the standards and/or methods described in example 5.

TABLE 5

|  | Composition R | Composition 2 | Composition 3 |
|---|---|---|---|
| Mooney consistency | 56 | 50 | 61.5 |
| Vulcanization |  |  |  |
| Cmin (In. lb) | 11.4 | 8.6 | 10.4 |
| Ts2 (min) | 9 | 7 | 6.4 |
| T90 (min) | 34 | 27.3 | 29.3 |
| Cmax (In. lb) | 64 | 65.2 | 66.2 |
| Mechanical |  |  |  |
| Modulus 10% (MPa) | 0.41 | 0.34 | 0.39 |
| Modulus 100% (MPa) | 2.2 | 2.3 | 3.0 |
| Modulus 300% (MPa) | 12.9 | 9.9 | 4.6 |
| Dynamic (Payne effect) |  |  |  |
| ΔG' (MPa) | 1.15 | 0.67 | 0.68 |
| tan δ max | 0.36 | 0.27 | 0.26 |
| Temp. dynamic |  |  |  |
| tan δ max (T) | 0.67 | 1.80 | 1.67 |

TABLE 6

| Aging | Composition R | Composition 2 | Composition 3 |
|---|---|---|---|
| Deformation at break |  |  |  |
| Initial | 100 | 100 | 100 |
| Thermal | 95 | 87 | 87 |
| UV | 69 | 90 | 90 |
| Tensile strength |  |  |  |
| Initial | 100 | 100 | 100 |
| Thermal | 104 | 104 | 105 |
| UV | 68 | 101 | 101 |

Likewise, it is found that compositions 2 and 3 according to the invention exhibit an advantageous compromise in properties with respect to the reference composition. (composition R).

With a Mooney viscosity and kinetics of vulcanization comparable to those of the reference composition, composition 2 and especially composition 3 result in a more pronounced strengthening in terms of modulus at 100% deformation. A sharp drop in the amplitude of the fall in the modulus (Payne effect) is observed with compositions 2 and 3, being revealed also by a drop in a maximum of tangent δ as a function of the deformation. The Payne effect and the energy dissipation are thus lower with the compositions according to the invention with respect to the reference composition.

Furthermore, quite outstanding dynamic properties are observed at approximately 0° C. with compositions 2 and 3. This is because the maximum of tangent δ (T), which is positioned at T=0° C., is 2 to 3 times higher with compositions 2 and 3 than with the reference composition.

Finally, compositions 2 and 3 offer a resistance to thermal aging and to uv aging which is comparable to, indeed even greater than, that of the reference composition.

What is claimed is:

1. A rubber composition, comprising as a filler an amorphous aluminum hydroxycarbonate, hydroxyoxycarbonate or oxycarbonate compound.

2. A rubber composition as claimed in claim 1, wherein said hydroxycarbonate, hydroxyoxycarbonate or oxycarbonate compound comprises at least 0.01 mol of carbonate per mole of aluminum.

3. A rubber composition as claimed in claim 2, wherein said hydroxycarbonate, hydroxyoxycycarbonate or oxycarbonate compound comprises at least 0.04 mol of carbonate per mole of aluminum.

4. A rubber composition as claimed in claim 3, wherein said hydroxycarbonate, hydroxyoxycarbonate or oxycarbonate compound comprises at least 0.1 mol of carbonate per mole of aluminum.

5. A rubber composition as claimed in claim 1, wherein the hydroxycarbonate, hydroxyoxycarbonate or oxycarbonate compound have covalent carbonates.

6. A rubber composition as claimed in claim 4, wherein said compound has a BET specific surface area of between 40 and 150 $m^2/g$.

7. A rubber composition as claimed in claim 6, wherein said compound exhibits a level of fines ($\tau_f$), after deagglomeration with ultrasound, of at least 80%.

8. A rubber composition as claimed in claim 1, wherein said compound is an amorphous aluminum hydroxycarbonate of formula $$Al(OH)_x(CO_3)_y \cdot zH_2O$$

wherein:

$0.5 \leq x \leq 3$, $0.01 \leq y \leq 0.25$, and $z \leq 1.5$.

9. A rubber composition as claimed in claim 1, wherein s ad compound remains amorphous after having been calcined between 150 and 700° C. for 2 hours.

10. A rubber composition as claimed in claim 9, wherein said compound remains amorphous after having been a rapidly dehydrated with a gas stream at 600° C., the contact time of said compound with said gas being from 1 to 2 seconds.

11. A rubber composition as claimed in claim 1, wherein said compound results from the calcination between 150 and 700° C. of an amorphous aluminum hydroxycarbonate.

12. A rubber composition as claimed in claim 11, wherein said starting amorphous aluminum hydroxycarbonate remains amorphous after having been rapidly dehydrated with a gas stream at 600° C., the contact time of said compound with said gas being from 1 to 2 seconds.

13. A rubber composition as claimed in claim 1, wherein said compound results from the rapid dehydration of an amorphous aluminum hydroxycarbonate using a gas stream at a temperature of between 500 and 700° C., the contact time of the hydroxycarbonate with said gas being between a fraction of a second and 4 seconds.

14. A rubber composition as claimed in claim 13, wherein said starting amorphous aluminum hydroxycarbonate is such that it remains amorphous after having been calcined between 150 and 700° C. for 2 hours.

15. A rubber composition as claimed in claim 11, wherein said starting amorphous aluminum hydroxycarbonate comprises at least 0.1, mol of carbonate per mole of aluminum.

16. A rubber composition as claimed in claim 11, wherein said compound is aluminum hydroxycarbonate with covalent carbonates group.

17. A rubber composition as claimed in claim 11, wherein said starting amorphous aluminum hydroxycarbonate has a BET specific surface area of between 40 and 150 m²/g.

18. A rubber composition as claimed in claim 11, wherein said starting amorphous aluminum hydroxycarbonate is of the following formula $$Al(OH)_x(CO_3)_y \cdot zH_2O$$

wherein:

$0.5 \leq x \leq 3$, $0.01 \leq y \leq 0.25$, and $z \leq 1.5$.

19. A rubber composition as claimed in claim 1, wherein said rubber composition comprises one elastomer exhibiting a glass transition temperature of between −150 and +20° C.

20. A rubber composition as claimed in claim 1, further comprising a coupling agent or a coating agent.

21. A rubber composition whose filler consists of an amorphous aluminum hydroxycarbonate, hydroxyoxycarbonate or oxycarbonate compound.

22. A finished article comprising a rubber composition as defined in claim 1.

23. The composition as claimed in claim 18, characterized in that said starting amorphous aluminum hydroxycarbonate corresponds to the following empirical formula $$Al(OH)_x(CO_3)_y \cdot zH_2O$$

in which $0.5 \leq x \leq 3$ $0.01 \leq y \leq 0.25$ $z \leq 1.5$.

24. The composition as claimed in claim 19, characterized in that said composition is based on at least one elastomer exhibiting a glass transition temperature of between −150 and +20°C.

25. The composition as claimed in claim 20, characterized in that said rubber composition additionally comprises at least one coupling agent and/or at least one coating agent.

26. A finished article based on at least one composition as defined in claim 21.

* * * * *